(12) United States Patent
Lee et al.

(10) Patent No.: US 10,958,894 B2
(45) Date of Patent: Mar. 23, 2021

(54) IMAGE PROCESSING METHOD AND ELECTRONIC DEVICE SUPPORTING IMAGE PROCESSING

(71) Applicant: Samsung Electronics Co., Ltd., Gyeonggi-do (KR)

(72) Inventors: Song Yi Lee, Seoul (KR); Young Mi Shin, Seoul (KR); Jin Soo Ha, Seoul (KR); Jang Woon Kim, Seoul (KR); Hyun Keun Son, Seoul (KR); Joo Hyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/462,261

(22) PCT Filed: Nov. 17, 2017

(86) PCT No.: PCT/KR2017/013106
§ 371 (c)(1),
(2) Date: May 20, 2019

(87) PCT Pub. No.: WO2018/093197
PCT Pub. Date: May 24, 2018

(65) Prior Publication Data
US 2019/0342540 A1  Nov. 7, 2019

(30) Foreign Application Priority Data
Nov. 18, 2016 (KR) .......................... 10-2016-0154078

(51) Int. Cl.
*H04N 13/261* (2018.01)
*H04N 13/349* (2018.01)
*H04N 7/14* (2006.01)

(52) U.S. Cl.
CPC ........... *H04N 13/261* (2018.05); *H04N 7/141* (2013.01); *H04N 13/349* (2018.05)

(58) Field of Classification Search
CPC .................................................. H04N 13/261
See application file for complete search history.

(56) References Cited

U.S. PATENT DOCUMENTS 8,203,577 B2   6/2012  Hoover
8,224,108 B2 *  7/2012  Steinberg ............. H04N 5/2352
                                                    382/255

(Continued)

FOREIGN PATENT DOCUMENTS

EP    2 669 883 A2   12/2013
EP    2 843 499 A2    3/2015
(Continued)

OTHER PUBLICATIONS

European Search Report dated Oct. 18, 2019.
European Search Report dated Jan. 14, 2021.

*Primary Examiner* — Irfan Habib
(74) *Attorney, Agent, or Firm* — Cha & Reiter, LLC

(57) ABSTRACT

An embodiment of the disclosure discloses an electronic device including at least one camera module to capture an image based on a specified angle of view, a display to display the image, a processor electrically connected with the camera module and the display. The processor detects a plurality of objects in the image, and performs setting of image data associated with at least one object of the plurality of objects such that a region, which corresponds to the at least one object, in a screen region of the display has a specified light transmittance value. Moreover, various embodiment found through the disclosure are possible.

10 Claims, 12 Drawing Sheets

(56) References Cited

U.S. PATENT DOCUMENTS

| | | | |
|---|---|---|---|
| 8,265,399 B2 * | 9/2012 | Steinberg | G06K 9/00228 |
| | | | 382/216 |
| 8,682,082 B2 * | 3/2014 | Evanitsky | G06F 16/58 |
| | | | 382/209 |
| 8,711,198 B2 | 4/2014 | Malzbender et al. | |
| 8,928,659 B2 | 1/2015 | Bar-Zeev et al. | |
| 8,957,919 B2 | 2/2015 | Han et al. | |
| 9,055,186 B2 | 6/2015 | Lin et al. | |
| 9,098,775 B2 * | 8/2015 | Matsunaga | G06K 9/6281 |
| 9,123,285 B2 | 9/2015 | Ko | |
| 9,368,081 B2 | 6/2016 | Kim | |
| 9,602,767 B2 | 3/2017 | Travis et al. | |
| 9,934,251 B2 * | 4/2018 | Inoue | G06Q 30/0282 |
| 10,049,460 B2 * | 8/2018 | Romano | G06T 7/521 |
| 2005/0185861 A1 * | 8/2005 | Kudoh | G06F 16/583 |
| | | | 382/305 |
| 2009/0079765 A1 | 3/2009 | Hoover | |
| 2011/0032329 A1 * | 2/2011 | Bauza | H04N 13/261 |
| | | | 348/43 |
| 2011/0242103 A1 | 10/2011 | Han et al. | |
| 2011/0316853 A1 | 12/2011 | Bar-Zeev et al. | |
| 2012/0026277 A1 * | 2/2012 | Malzbender | H04N 7/15 |
| | | | 348/14.07 |
| 2012/0069050 A1 * | 3/2012 | Park | G06F 3/04883 |
| | | | 345/632 |
| 2012/0308118 A1 * | 12/2012 | Kwon | H04N 13/261 |
| | | | 382/154 |
| 2013/0016096 A1 * | 1/2013 | Kwon | H04N 13/261 |
| | | | 345/419 |
| 2013/0268882 A1 * | 10/2013 | Roh | G06F 3/04883 |
| | | | 715/782 |
| 2013/0314433 A1 * | 11/2013 | Ko | G09G 3/20 |
| | | | 345/592 |
| 2013/0342731 A1 * | 12/2013 | Lee | H04N 5/23218 |
| | | | 348/231.4 |
| 2014/0078089 A1 | 3/2014 | Lee et al. | |
| 2014/0195957 A1 * | 7/2014 | Bang | G06F 3/0486 |
| | | | 715/773 |
| 2014/0267803 A1 * | 9/2014 | Shintani | H04N 5/23218 |
| | | | 348/208.2 |
| 2014/0347436 A1 * | 11/2014 | DeMerchant | H04N 7/142 |
| | | | 348/14.08 |
| 2014/0361984 A1 * | 12/2014 | Kim | G02B 27/017 |
| | | | 345/156 |
| 2015/0029294 A1 | 1/2015 | Lin et al. | |
| 2015/0062175 A1 * | 3/2015 | Kim | G09G 5/10 |
| | | | 345/639 |
| 2015/0084861 A1 * | 3/2015 | Cheon | G06F 3/0482 |
| | | | 345/156 |
| 2016/0105640 A1 | 4/2016 | Travis et al. | |
| 2017/0237941 A1 * | 8/2017 | Vats | H04N 7/157 |
| | | | 348/14.07 |
| 2018/0139405 A1 * | 5/2018 | Baek | H04N 21/4728 |
| 2018/0150955 A1 * | 5/2018 | Takeda | G06K 9/00228 |

FOREIGN PATENT DOCUMENTS

| | | |
|---|---|---|
| JP | 2016-181004 A | 10/2016 |
| KR | 10-2011-0111605 A | 10/2011 |
| KR | 10-2014-0037753 A | 3/2014 |
| KR | 10-2015-0026565 A | 3/2015 |
| WO | 2016/024288 A1 | 2/2016 |

* cited by examiner

IMAGE PROCESSING METHOD AND ELECTRONIC DEVICE SUPPORTING IMAGE PROCESSING

CLAIM OF PRIORITY

This application is a National Phase Entry of PCT International Application No. PCT/KR2017/013106, which was filed on Nov. 17, 2017 and claims a priority to Korean Patent Application No. 10-2016-0154078, which was filed on Nov. 18, 2016, the contents of which are incorporated herein by reference.

TECHNICAL FIELD

Embodiments disclosed in the disclosure relate to an image processing technology based on a transparent display.

BACKGROUND ART

A transparent display has a primary function of displaying various images and a space-friendly advantage of showing a rear portion of the display, thereby supporting various operating environments. For example, the transparent display is employed as a show window or a smart window in a residential or work space or a transportation, such as a vehicle, an air plane, or a ship, to serve as a basis for constructing an information telecommunication infrastructure in a new aspect. Recently, the transparent display has been introduced into an internet of things environment or an augmented reality environment. Accordingly, there is required the development of a grafting technology based on the interaction between functions of the electronic device and the transparent display.

DISCLOSURE

Technical Problem

Various embodiments disclosed in the disclosure provide an image processing method and an electronic device supporting the same, capable of giving stereoscopic effect to an image displayed on a transparent display, by controlling a screen element (e.g., light transmittance, color, or saturation) of a screen region corresponding to a relevant object on the transparent display, based on image data setting for at least one object included in the image.

Technical Solution

According to an embodiment, an electronic device may include at least one camera module to capture an image based on a specified angle of view, a display to display the image, and a processor electrically connected with the camera module and the display.

According to an embodiment, the processor may detect a plurality of objects included in the image, and may perform setting of image data associated with at least one object of the plurality of objects such that a region, which corresponds to the at least one object, in a screen region of the display has a specified light transmittance value.

Advantageous Effects

According to various embodiments, the electronic device may support the display of a stereoscopic image on the external device interacting with the electronic device in association with the use of the video telephone function.

Besides, a variety of effects directly or indirectly understood through the disclosure may be provided.

MODE FOR INVENTION

Figure 1:
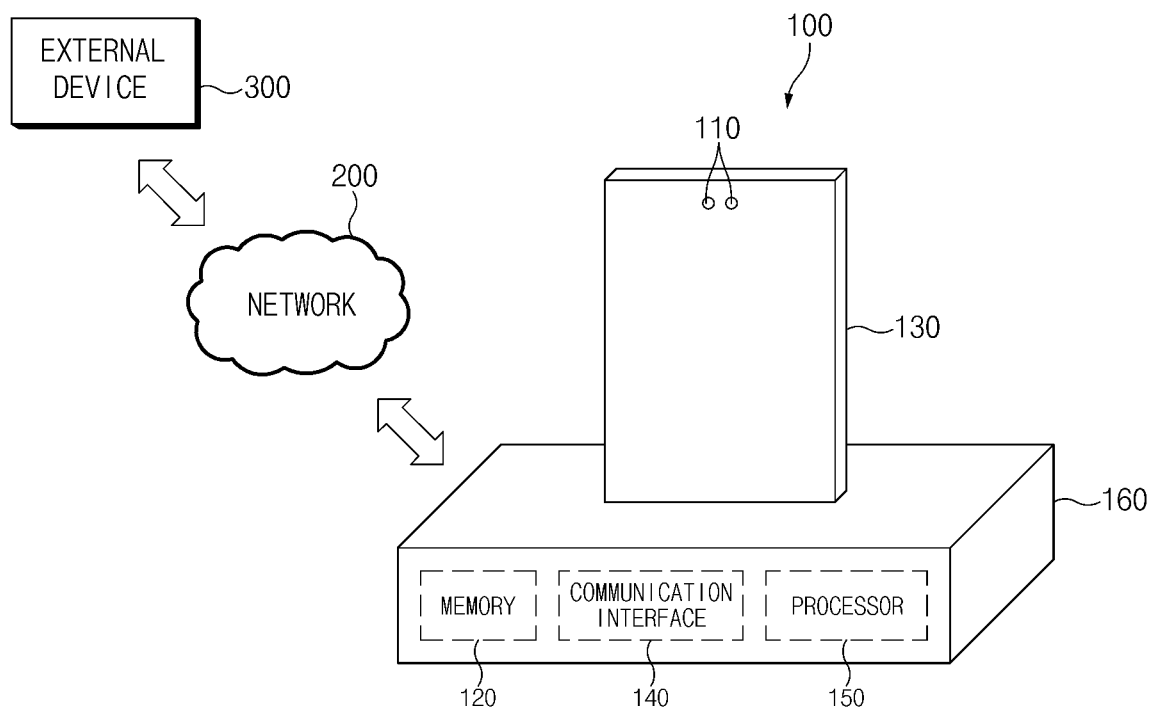
FIG. 1 is a view illustrating an electronic device, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like).

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a view illustrating an electronic device, according to an embodiment.

Referring to FIG. 1, an electronic device 100 may construct a network 200 together with at least one external device 300 (or an external server). The electronic device 100 may transmit data or a signal associated with function use to the external device 300 or may receive the data or the signal from the external device 300, by accessing the network 200. According to various embodiments, the network 200 may include a computer network (e.g., a local area network (LAN) or a wired area network (WAN)), the Internet, or a telephone network.

According to an embodiment, the electronic device 100 may include a camera module 110, a memory 120, a display 130, a communication interface 140, a processor 150, and a housing 160. According to various embodiments, the electronic device 100 may not include at least one of the above-described components or may further include any other component(s). For example, the electronic device 100 may further include a power supply device (e.g., a battery) to supply electrical energy to the components, a sensor module (e.g., a proximity sensor, an acceleration sensor, a fingerprint sensor, or an iris sensor) to sense various pieces of information, or a speaker module to output a sound acquired from an inside or an outside.

The housing 160 may receive at least some of the components (e.g., the memory 120, the communication interface 140, or the processor 150) of electronic device 100 described above, or may support the mounting of the at least some of the components. The housing 160 may include a bottom surface, at least one side surface extending at a specified angle (e.g., substantially perpendicularly) from an edge of the bottom surface at a specified angle, and a top surface opposite to the bottom surface. At least a portion of the top surface may be open. For example, a region having a specified area from the center of the top surface may be open, so the housing 160 may include an inner space having at least a partial region that is open. According to various embodiments, the housing 160 may include, in at least a partial region thereof, at least one opening (not illustrated) for exposing a functional key (e.g., a power key or a volume control key) associated with the use of the electronic device 100.

The camera module 110 may capture an image (e.g., a still image or a video, etc.) of the surrounding region of the electronic device 100 based on a specified angle of view. In one embodiment, the camera module 110 may be disposed in a partial front region of the electronic device 100 to have an angle of view in a first direction (e.g., forward of the electronic device 100). For example, the camera module 110 is disposed on a front region of the display 130 having at least a portion exposed out of the housing 160. In this case, the camera module 110 may be disposed at an edge of the display 130 such that the visibility of content displayed on the display 130 is not interrupted. In one embodiment, the camera module 110 may include a first camera and a second camera. Any one of the first camera and the second camera may include a 3D depth camera. The angles of view of the first camera and the second camera may be similar to each other or may at least partially overlap with each other. In various embodiments, a plurality of camera modules 110 may be provided to have angles of view in the first direction and a second direction (e.g., rearward of the electronic device 100) opposite to the first direction, and may be disposed on front and rear surfaces of the display 130.

The memory 120 may store a command or data associated to another component of the electronic device 100 or the external device 300 that interacts with the electronic device 100. For example, the memory 120 may store an image captured by the camera module 110 or data based on content received from the external device 300. In one embodiment, the memory 120 may include a content (e.g., a video) analysis database. The content analysis database may be used, for example, to detect an object specified for any content. In this regard, the content analysis database may include relevant information (e.g., the shape, feature, or contour of the object) of the specified object.

The memory 120 may include at least one program associated with the function use of the electronic device 100. The program may include, for example, an application program (e.g., a call program), a kernel, a middleware or an application programming interface (API). At least a portion of the kernel, the middleware, or the API may be called as an operating system (OS). According to various embodiments, the memory 120 may include at least one of a volatile memory (e.g., a dynamic random access memory (DRAM), a static RAM (SRAM), or a synchronous DRAM (SDRAM)), a nonvolatile memory (e.g., one time programmable read only memory (OTPROM), a programmable ROM (PROM), an erasable and programmable ROM (EPROM), an electrically erasable and programmable ROM (EEPROM) or the like), a mask ROM, a flash ROM, or a flash memory.

The display 130 may display various screens corresponding to user control or specified scheduling information. For example, the display 130 may display an image (e.g., a still image or a video) captured by the camera module 110 or content received from the external device 300. According to an embodiment, the display 130 may display multiple pieces of content (e.g., video) on a single screen. For example, the display 130 may display first content (e.g., a first image), which is received from the external device 300, in a specified first size on a portion of the screen region and display second content (e.g., a second image), which is produced by the camera module 110, in a second size on a remaining portion of the screen region, when specific program (e.g., video telephone program) is executed. According to various embodiments, the first size and the second size for displaying multiple pieces of content may be equal to or approximate to each other. Alternatively, the display 130 may display the first content in a specified size (e.g., a full screen size) on the screen region and may display second content, which overlaps with at least a partial region of the first content, produced by the camera module 110.

According to an embodiment, the display 130 may include a transparent display that is able to control a specified screen element (e.g., light transmittance (or transparency), color, or saturation) under the control of the processor 150. In this regard, at least one component associated with the function operation of the display 130 (or included as the component of the display 130) may be formed of a transparent material. For example, when the display 130 is implemented with a touch screen, at least one electrode layer associated with the detection of a user input (e.g., a touch, proximity, drag, or hovering) may include a transparent conductive film (e.g., Indium Tin Oxide (ITO)). In addition, a control circuit to calculate the coordinates, in which the user input is made, or the duration of the user input based on the variation in the physical quantity (e.g., a voltage or a capacitance) of the at least one electrode layer may be disposed, for example, in the internal space of the housing 160 while avoiding the display 130.

The communication interface 140 (or communication module) may support communication between the electronic device 100 and the external device 300. For example, the communication interface 140 may support the communication between the electronic device 100 and the external device 300 by accessing the network 200 based on wired communication or wireless communication. According to various embodiments, the wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. The wireless communication may include short range communication, such as wireless fidelity (Wi-Fi), Bluetooth, near field communication (NFC), or magnetic stripe transmission (MST).

The processor 150 is electrically or operatively connected with other components of the electronic device 100 to perform a control, a communication computation, or data processing for the components. For example, the processor 150 may perform setting of image data on at least one image (e.g., a still image or video) captured based on the camera module 110. The setting of the image data may be associated with the control of a screen element (e.g., light transmittance (or transparency), color, or saturation) for at least a partial region of the display 130 when the image is displayed on the display 130 (e.g., a transparent display). For example, when the setting of the image data on a specific object of at least one object included in an image is performed by the processor 150, a region, which corresponds to the specified object on the display 130, may be controlled and displayed based on a screen element (e.g., light transmittance (or transparency) color, or saturation) based on the setting of the image data.

According to an embodiment, the processor 150 may perform the setting of the image data based on any one of a plurality of images captured by the first camera and the second camera of the camera module 110. In addition, the processor 150 may perform the setting of the image data based on the combination of the plurality of images. The processor 150 may transmit data on an image, which is subject to the setting of the image data, to the external device 300 by controlling the function operation of the communication interface 140.

Figure 2A:
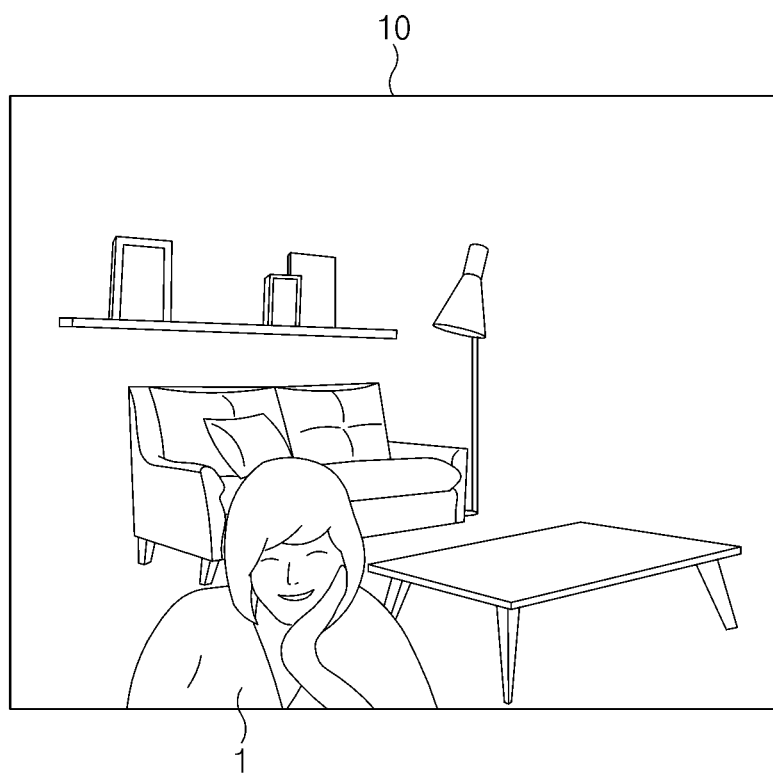
FIG. 2A is a view illustrating a first image, according to an embodiment.
Figure 2B:
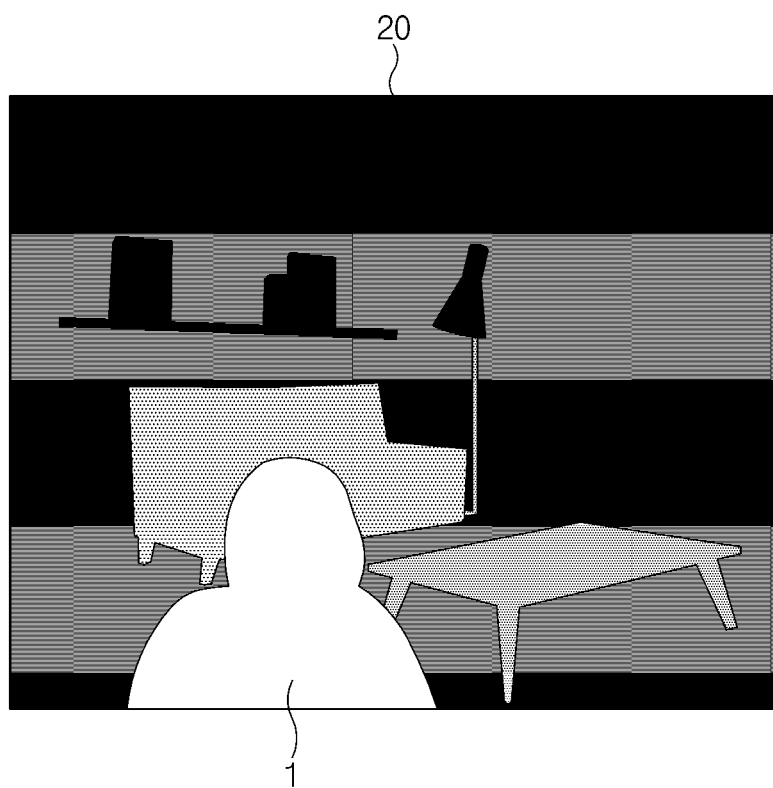
FIG. 2B is a view illustrating a second image, according to an embodiment.
Figure 2C:
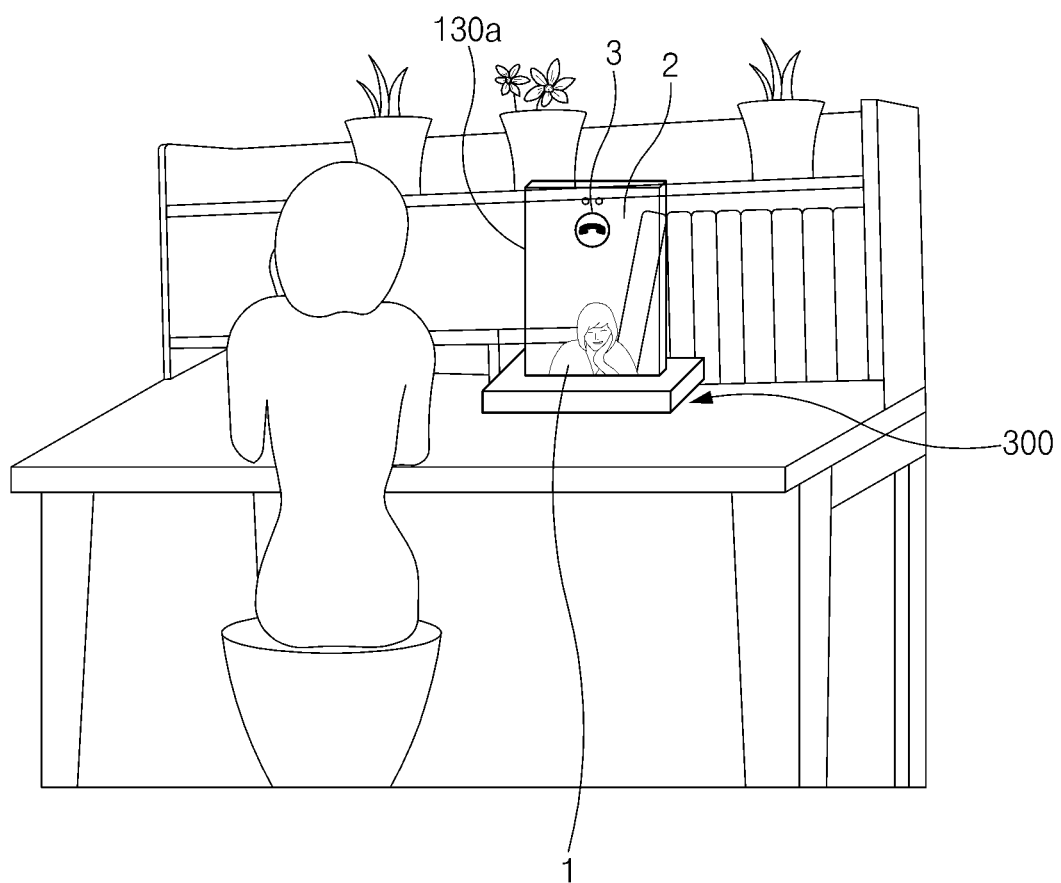
FIG. 2C is a view illustrating an image display state on a display, according to an embodiment.

FIG. 2A is a view illustrating a first image, according to an embodiment, FIG. 2B is a view illustrating a second image, according to an embodiment, and FIG. 2C is a view illustrating an image display state on the display, according to an embodiment. The functions or the operations to be described with reference to FIGS. 2A, 2B, and 2C may be associated with a video telephone environment between the electronic device and the external device.

Referring to FIG. 2A, the processor 150 (see FIG. 1) may perform image data setting based on a first image 10 captured by the first camera of a camera module 110 (see FIG. 1). In this regard, the processor 150 may perform image analysis by obtaining the first image 10 from the camera module 110 or the memory 120 (FIG. 1). For example, the processor 150 may detect at least one object (hereinafter, referred to as a "first object") included in the first image 10 based on image processing such as edge detection filtering, or active contours modeling. According to an embodiment, the processor 150 may extract a specified object (e.g., a human body; hereinafter referred to as a "second object") of the first object based on a machine learning algorithm (e.g., deep learning). In this operation, the processor 150 may refer to a content analysis database constructed in the memory 120. For example, the processor 150 may identify an object, which is matched at a specified ratio or more with the contour of the second object, of the detected first object, based on the information on the contour (or the shape) of the second object included in the content analysis database and may extract a second object 1 from the first image 10. In addition, the processor 150 may extract at least one feature of the detected first object and may extract the second object 1 from the first image 10, based on the comparison between the at least one feature of the first object and feature point information, which is included in the content analysis database, of the second object.

According to an embodiment, the processor 150 may perform image data setting for a remaining object (hereinafter, referred to as a "third object") of the at least one first object except for the extracted second object 1. The processor 150 may control the light transmittance of the screen region corresponding to the third object on the display 130 (FIG. 1; e.g., a transparent display) to be a specified value, based on the image data setting. For example, the processor 150 may control the screen region of the third object to be transparent on the display 130 by setting an alpha (α) value (e.g., a value associated with the transparency of the image) for image data of the third object to a specified value (e.g., 100 in the range of 1 to 100). In addition, the processor 150 may control the screen region corresponding to the third object to be transparent on the display 130 by setting R, G, and B grayscale values of the image data of the third object to a specified value (e.g., 255).

According to various embodiments, the processor 150 may further control screen elements such as color or saturation as well as the control of the light transparency, based on the image data setting for a specific object or region in the first image 10. For example, the processor 150 may control the output of the display 130 such that a region of the display 130 except for the second object 1 is displayed in specific color, or displayed to be clear or blurred. Hereinafter, the control of the light transparency for a specific screen region of the display 130 will be described as screen element control of the display 130 based on the image data setting by way of example.

Referring to FIG. 2B, the processor 150 may perform image data setting based on a second image 20 captured by the second camera (e.g., a depth camera) of the camera module 110. The second image 20 may include depth information (or distance information based on the second camera) of at least one object included in an image. The depth information may be calculated based on time in which a signal (e.g., infrared signal) transmitted from the second camera is reflected from an object and returns to the second camera. The processor 150 may identify a layer including the object 1 present at less than a specified depth (or distance) on the second image 20 based on the depth information. According to an embodiment, the processor 150 may perform the above-described image data setting with respect to the remaining layer except for the identified layer. For example, the processor 150 may set at least one alpha (α) value to a specified value (100 in the range of 1 to 100) or R, G, and B grayscale values to a specified value (e.g., 255), with respect to image data of at least one object included in the remaining layer.

According to an embodiment, the processor 150 may perform image data setting with respect to the first image 10 and the second image 20 by combining the first image 10 and the second image 20. For example, the processor 150 may extract a specified object (e.g., a human body) from at least one object included in the first image 10 based on the image analysis for the first image 10, and may map the first image 10 to the second image 20. The processor 150 may exclude the depth information from the second image 20 and may identify an object, which is mapped to an object (e.g., a human body) extracted from the first image 10 at an equal ratio or an approximate ratio, and a layer including the object. The processor 150 may perform image data setting (e.g., the setting of an alpha (α) value or the setting of the R, G, and B grayscale values) with respect to remaining layers except for the identified layer. The processor 150 may perform image data setting by clearly determining a region of a specified object (e.g., a human body) included in the image, based on the combination of the first image 10 and the second image 20.

According to an embodiment, the processor 150 may transmit information on the image data setting performed based on any one of the first image 10 or the second image 20 to an external device (300 of FIG. 1) together with the data on the first image 10. According to an embodiment, the processor 150 may transmit information on the image data setting, which is performed based on the combination of the first image 10 or the second image 20, to the external device 300 together with the data on the first image 10.

Referring to FIG. 2C, the external device 300 may receive information on image data setting and data on the first image 10 (FIG. 2A) from the electronic device 100 (FIG. 1) and may display the first image 10 on a display included in the external device 300. In this regard, the external device 300 may include a transparent display 130a. According to an embodiment, the information on the image data setting may include image data, the alpha (α) value of which is set to a specified value (e.g., 100 in the range of 1 to 100), on a remaining object (a layer except for a layer including the object 1) of at least one object included in the first image 10 except for the specified object 1 (e.g., the human body of a user of the electronic device 100). In addition, the information of the image data setting may include image data, R, G, and B values of which are set to a specified value (e.g., 255), on the remaining object (or the layer except for the layer including the object 1) except for the specified object 1. Accordingly, a region 2 (or the background region of the specified object 1) except for the specified object 1 of the screen region of the transparent display 130a provided in the external device 300 to display the first image 10 may be transparently controlled corresponding to the alpha (α) value or the R, G, and B values, and an arbitrary object (e.g., a book) disposed at the rear portion of the transparent display 130a may be visualized. According to various embodiments, a display object 3 (e.g., an icon) associated with the termination of the video telephone function may be displayed on some region of the transparent display, in relation to the use of the video telephone.

In various embodiments, the user of the electronic device 100 may control, for example, content (e.g., video) transmission setting when operating the video telephone function. For example, the user of the electronic device 100 may control the above-described information on image data setting not to be transmitted to the external device 300 through the user interface associated with content transmission setting or based on system setting of the electronic device 100. In this case, the transparent display 130a of the external device 300 may display the first image 10 received from the electronic device 100 without change.

In various embodiments, the external device 300 may include a camera that is the same as or corresponds to at least one of a first camera or a second camera (e.g., a depth camera) of the electronic device 100. The external device 300 may perform image data setting which are the same as or similar to image data setting of the electronic device 100 described above, to the image captured by the camera. Accordingly, the electronic device 100 may receive information on the image data setting from the external device 300 and may display the image on the display (130 in FIG. 1; e.g., a transparent display) in the form the same as or the form corresponding to the form illustrated in FIG. 3C.

Figure 3A:
FIG. 3A is a view illustrating a first image, according to an embodiment.
Figure 3B:
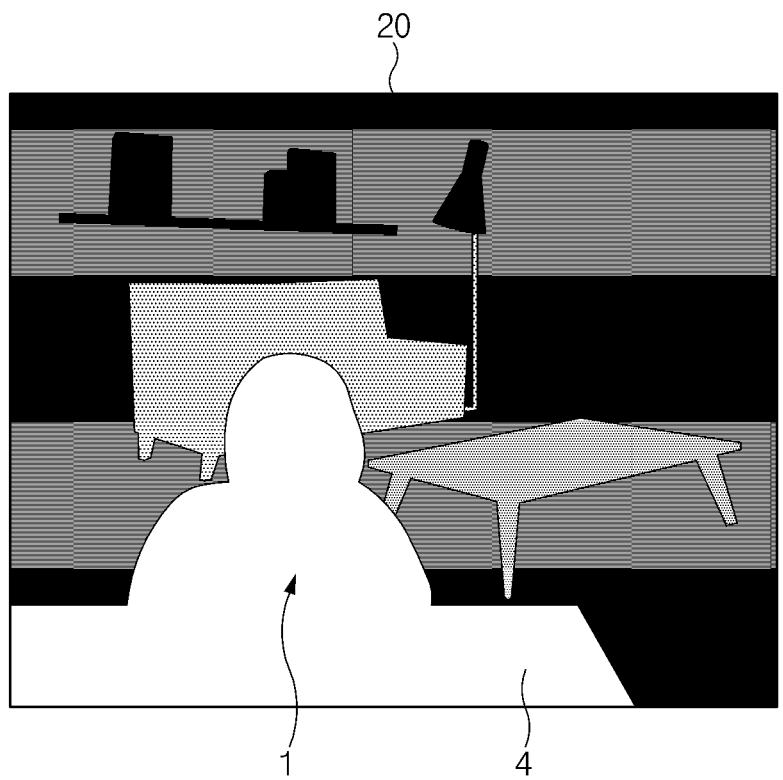
FIG. 3B is a view illustrating a second image, according to another embodiment.
Figure 3C:
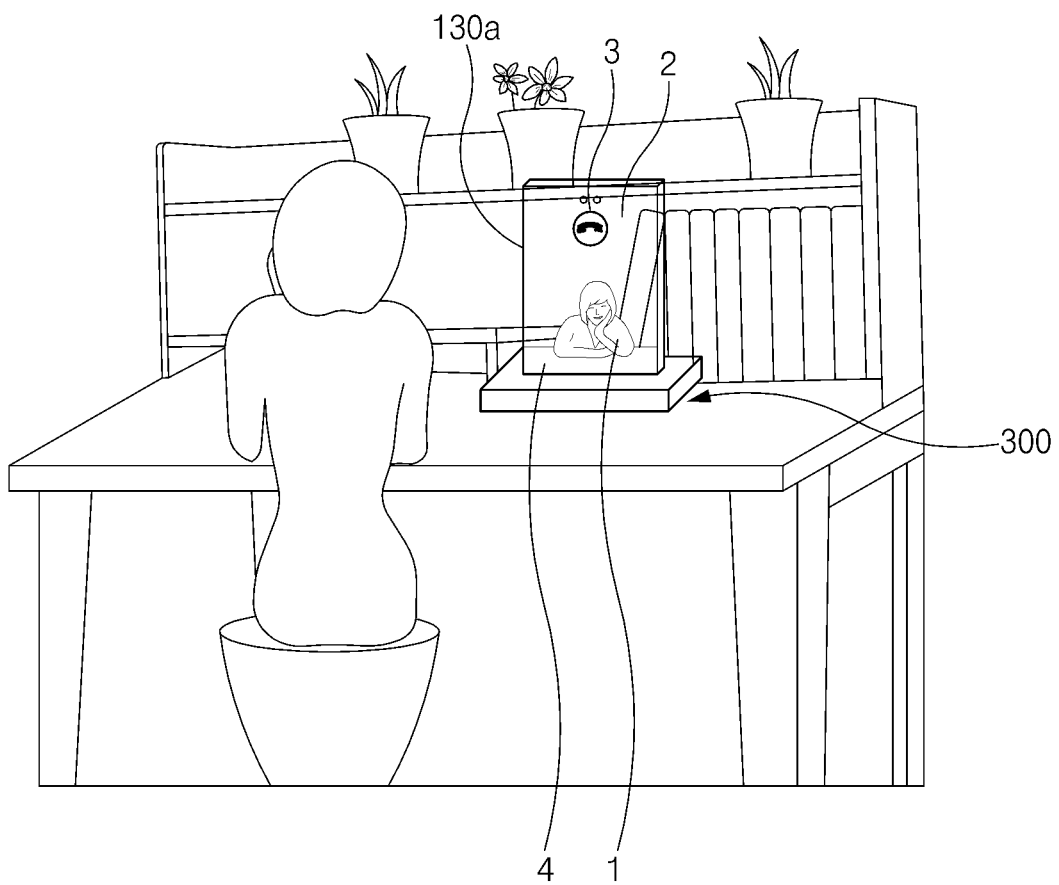
FIG. 3C is a view illustrating an image display state on a display, according to another embodiment.

FIG. 3A is a view illustrating a first image, according to another embodiment, FIG. 3B is a view illustrating a second image, according to another embodiment, and FIG. 3C is a view illustrating an image display state on a display, according to another embodiment. In FIGS. 3A, 3B, and 3C, the functions or operations performed by an electronic device or an external device may be similar to or correspond to those described above with reference to FIGS. 2A, 2B, and/or 2C. Hereinafter, the function or operations different from those descried with reference to FIGS. 2A, 2B, and/or 2C will be described.

Referring to FIG. 3A, a processor 150 (see FIG. 1 performs image analysis with respect to a first image 10 captured by a first camera of a camera module 110 (see FIG. 1) and may detect at least one object (hereinafter, referred to as a first object) from the first image 10. The processor 150 may extract an object 1 (e.g., a human body; hereinafter, referred to as "second object"), which is specified from the first object, from the content analysis database constructed in a memory 120 (see FIG. 1). In one embodiment, the detected first object may include at least one object (hereinafter, referred to as a "third object") associated to the second object 1. For example, the at least one first object may include a third object positioned forward from the second object 1 on the first image 10 or the third object which is included in an upper layer of a layer including the second object 1 to overlap with the second object. In this case, the processor 150 may determine the third object 4 as at least a portion of the second object 1 by considering the disconnection of at least a portion of the second object 1. The processor 150 may perform an image data setting operation of setting, for example, alpha (α) value to a specified value (e.g., 100 in the range of 1 to 100) or R, G, and B grayscale values to a specified value (e.g., 255), with respect to image data of remaining objects of at least one first object except for the second object 1 and the third object 4.

Referring to FIG. 3B, the processor 150 may obtain depth information (or the information on the distance from the second camera) of at least one object in the second image 20, based on the second image 20 captured by the second camera (e.g., a depth camera) of the camera module 110. In one embodiment, a plurality of objects 1 and 4 having depth values less than a specified depth may be included in the second image 20. The plurality of objects 1 and 4 may be included in the same layer having the same depth value or may be included in respective layers corresponding to different depth values, within the range less than the specified depth. The processor 150 may identify at least one layer corresponding to the plurality of objects 1 and 4 present at the depth less than the specified depth and may perform an image data setting operation by setting the alpha (α) value or the R, G, B grayscale values with respect to remaining layers of the second image 20 except for the identified layer.

Referring to FIG. 3C, the external device 300 may receive information on image data setting and data on the first image (10 of FIG. 3A) from the electronic device (100 of FIG. 1) and may display the first image 10 on the transparent display 130a. According to the information on the image data setting, a specified object 1 and an object 4 (e.g., an object positioned in front of the specified object 1 or an object overlapping with the specified object 1) associated with the specified object 1 may be displayed at least a portion of a screen region of the transparent display 130a displaying the first image 10. An arbitrary object (e.g., a book) positioned at a rear portion of the transparent display 130a may be visualized on a remaining portion of the screen region of the transparent display 130a by controlling the light transparency based on the image data, the alpha (α) value (100 in the range of 1 to 100) or the R, G, and B values (e.g., 255) of which are set to a specified value.

Figure 4A:
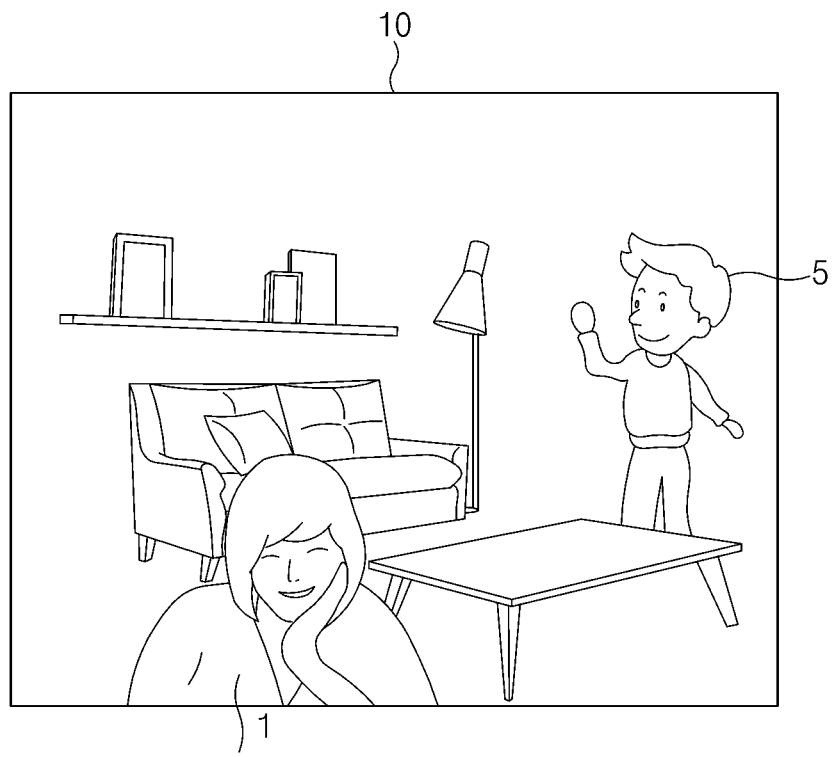
FIG. 4A is a view illustrating a first image, according to still another embodiment.
Figure 4B:
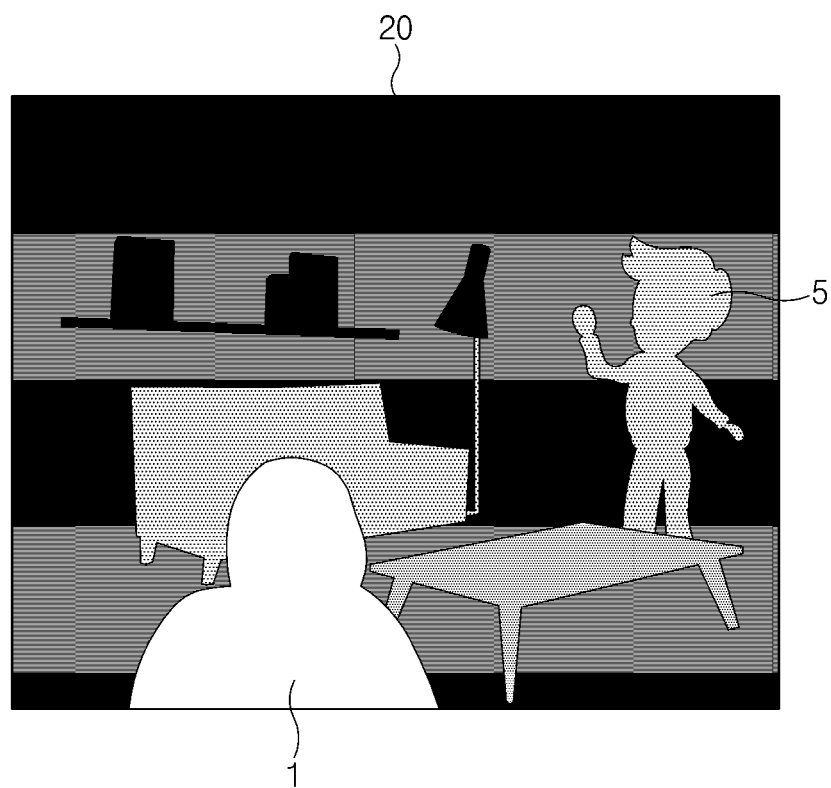
FIG. 4B is a view illustrating a second image, according to still another embodiment.
Figure 4C:
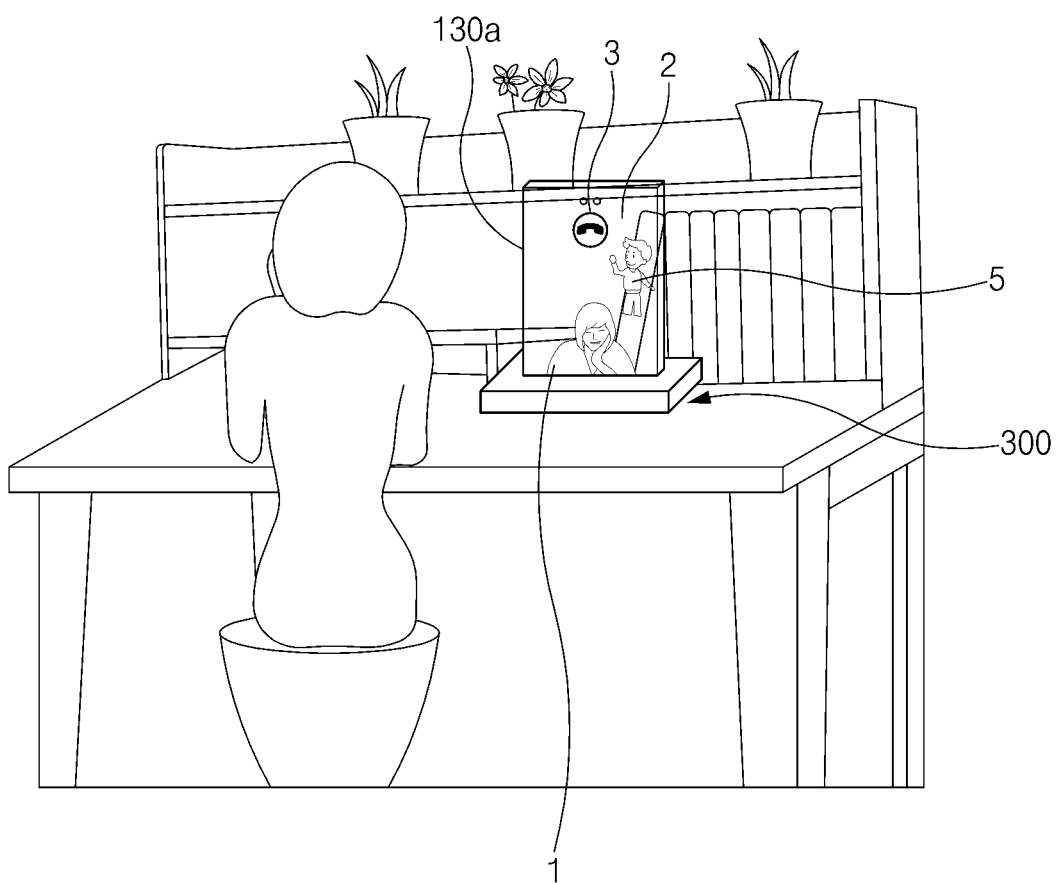
FIG. 4C is a view illustrating an image display state on a display, according to still another embodiment.

FIG. 4A is a view illustrating a first image, according to another embodiment, FIG. 4B is a view illustrating a second image, according to another embodiment, and FIG. 4C is a view illustrating an image display state on a display, according to another embodiment. In FIGS. 4A, 4B, and 4C, the functions or operations performed by an electronic device or an external device may be similar to or correspond to those described above with reference to FIGS. 2A, 2B, and/or 2C. Hereinafter, the function or operations different from those descried with reference to FIGS. 2A, 2B, and/or 2C will be described.

Referring to FIG. 4A, a processor 150 (see FIG. 1) may perform image analysis with respect to a first image 10 captured by a first camera of a camera module 110 (see FIG. 1). The processor 150 may detect at least one object (hereinafter, referred to as a first object) from a first image 10 through the image analysis. The processor 150 may extract an object (e.g., a human body; hereinafter, referred to as "second object"), which is specified in the first object, from a content analysis database constructed in the memory 120 (see FIG. 1). In an embodiment, the processor 150 may extract a plurality of second objects 1 and 5 from the first object. In this operation, the processor 150 may output a first user interface associated with image data setting for each of the plurality of second objects 1 and 5 which are extracted. The first user interface may include image content for the plurality of second objects 1 and 5 and a control tap to control whether the image data setting is performed with respect to each of the plurality of second objects 1 and 5. The electronic device 100 may control whether the image data setting is performed with respect to the plurality of second objects 1 and 5, based on a user input (e.g., a touch) applied to the control tap. According to an embodiment, when the user controls the plurality of second objects 1 and 5 such that none second object is subject to the image data setting, the processor 150 may perform the image data setting with respect to remaining objects of the first object, which is detected through the image analysis, except for the plurality of second objects 1 and 5.

Referring to FIG. 4B, in an embodiment, the processor 150 may obtain depth information of at least one object in a second image 20, based on the second image 20 captured by a second camera (e.g., a depth camera) of a camera module 110. In this operation, the processor 150 may output the second user interface including, for example, the depth information. The second user interface may include, for example, image content for at least one object included in the second image 20 and depth information corresponding to each object. The user of the electronic device 100 may select at least one object which is to be subject to the image data setting, based on the second user interface. For example, when the user applies a user input (e.g., a touch) onto at least one specific image content (e.g., image content corresponding to the objects 1 and 5) included in the second user interface, the processor 150 may perform image data setting with respect to a remaining layer on the second image 20 except for at least one layer including the relevant object of the specific image content.

Referring to FIG. 4C, the external device 300 may receive information on image data setting and data on the first image (10 of FIG. 3A) from the electronic device (100 of FIG. 1) and may display the first image 10 on the transparent display 130a. The information on the image data setting may include user control information based on the first user interface or the second interface described with reference to FIG. 4A or FIG. 4B. According to the image data setting information, the objects 1 and 5, which are controlled not to be subject to the image data setting by the user of the electronic device 100 or correspond to image contents selected by the user of the electronic device 100, may be displayed on at least a portion of the screen region of the transparent display 130a of the external device 300. An arbitrary object (e.g., a book), which is positioned at a rear portion of the transparent display 130a, may be visualized on a remaining portion of the screen region of the transparent display 130a, due to the light transparency resulting from the alpha ($\alpha$) value (100 in the range of 1 to 100) or the R, G, and B values (e.g., 255) based on the image data setting.

Figure 5:
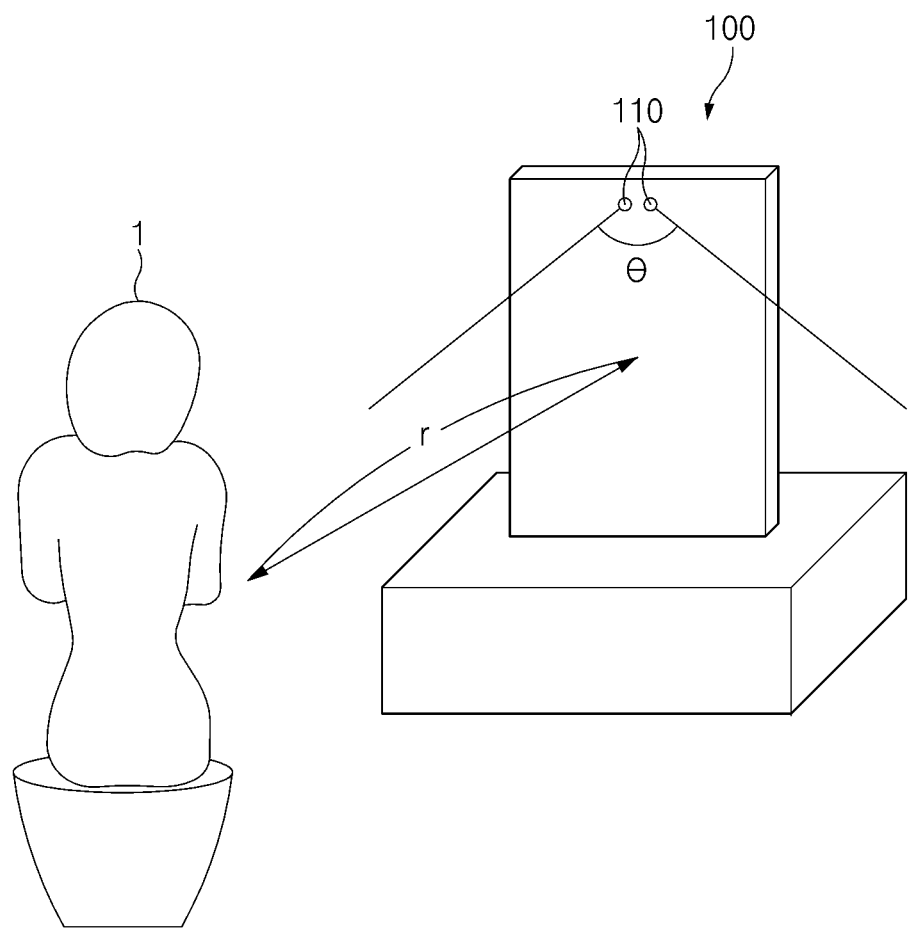
FIG. 5 is a view illustrating an operating environment of the electronic device, according to an embodiment.

FIG. 5 is a view illustrating an operating environment of the electronic device, according to an embodiment.

Referring to FIG. 5, the processor 150 (see FIG. 1) of the electronic device 100 may calculate the distance between the electronic device 100 and the user 1 by referring to the first image 10 (see FIG. 2A, 3A, or 4A) and the second image 20 (see FIG. 2B, 3B, or 4B) captured by the camera module 110 (see FIG. 1) in real time or at a specified period. For example, the processor 150 extracts a specified object (e.g., a human body) on the first image 10 and obtains depth information of the specified object through the mapping analysis to the second image 20, thereby tracking the variation in the distance between the electronic device 100 and the user 1. Alternatively, the processor 150 may determine whether the user 1 is present within the angle $\theta$ of view of the camera module 110 based on the analysis of the first image 10 or the second image 20.

In one embodiment, the processor 150 may control a specified function of the electronic device 100 based on the distance information from the user 1 and the determination of whether the user 1 is present within a specified range (e.g., the range of the angle of view of the camera module 110). For example, the processor 150 may operate or maintain the call function of the electronic device 100 as a video telephone function when the user 1 is present at the specified distance "r" or within the specified range "0". When it is not determined that the user 1 is present at less than the specified distance "r" or within the specified range "0", the processor 150 may operate or maintain the call function of the electronic device 100 as a voice call function.

As described above, according to various embodiments, an electronic device may include at least one camera module to capture an image based on a specified angle of view, a display to display the image, a processor electrically connected with the camera module and the display, According to various embodiments, the processor may detect a plurality of objects included in the image, and may perform setting of image data associated with at least one object of the plurality of objects such that a region, which corresponds to the at least one object, in a screen region of the display has a specified light transmittance value.

According to various embodiments, the electronic device may further include a communication interface to make communication with an external device.

According to various embodiments, the processor may transmit, to the external device, information on the image subject to the setting of image data based on the communication interface.

According to various embodiments, the processor may output a user interface that is able to control whether to transmit the information on the image subject to the setting of the image data.

According to various embodiments, the electronic device may further include a memory to store information on a specified object through a database.

According to various embodiments, the processor may extract the specified object from the plurality of objects based on the database; and may set image data associated with at least one object of the plurality of objects except for the specified object.

According to various embodiments, the processor may extract at least one object, which has a specified relationship with the specified object, from the plurality of objects, and may set image data associated with at least one object of the plurality of objects except for the specified object and the at least one object having the specified relationship.

According to various embodiments, the camera module may obtain depth information on the plurality of objects included in the image.

According to various embodiments, the processor may extract at least one object, which is present at less than a specified depth, from the plurality of objects based on the depth information, and may set image data associated with at least one object of the plurality of objects except for the at least one object present at less than the specified depth.

According to various embodiments, the processor may set an alpha (α) value, which is included in the image data, to a specified value in association with the setting of the image data.

According to various embodiments, the processor may sets R, G, and B grayscale values, which are included in the image data, to a specified value in association with the setting of the image data.

Figure 6:
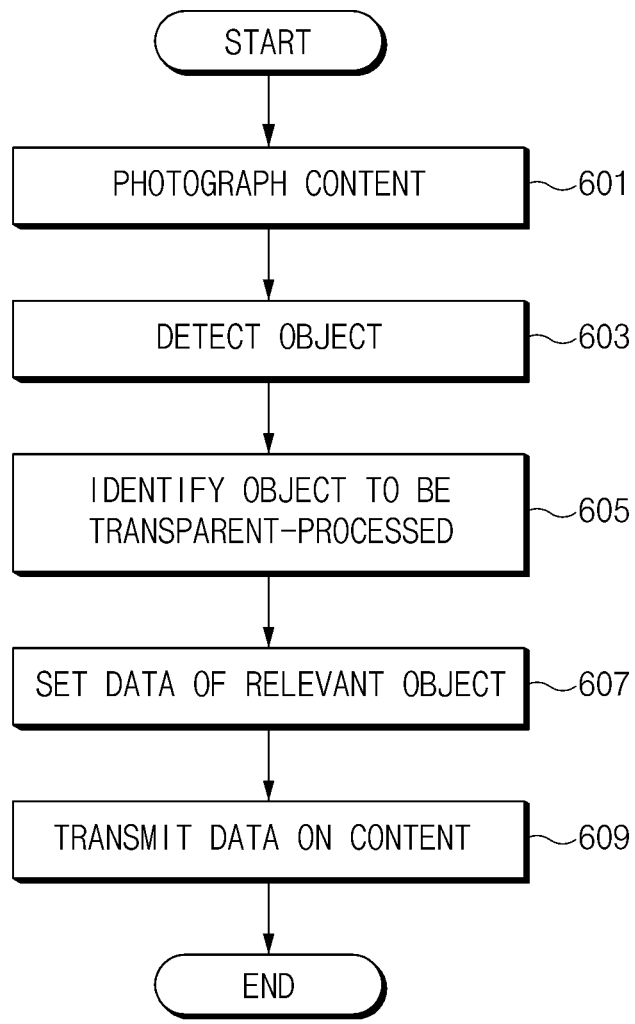
FIG. 6 is a view illustrating an image processing method of an electronic device, according to an embodiment.

FIG. 6 is a view illustrating an image processing method of the electronic device, according to an embodiment.

Referring to FIG. 6, in operation 601, the electronic device 100 (FIG. 1) may capture an image (e.g., a still image or a video) of a surrounding region of the electronic device 100 based on the camera module 110 (see FIG. 1). In one embodiment, the camera module 110 may include a first camera and a second camera. Any one of the first camera and the second camera may include a 3D depth camera. At least one image captured by the camera module may be stored in the memory 120 (see FIG. 1).

In operation 603, the processor 150 (see FIG. 1) of the electronic device may obtain an image from the camera module or the memory, analyze the image (e.g., through image processing based on a contour detection filter or an active contour model), and detect at least one object (hereinafter, referred to as "first object") included in the image. Alternatively, the processor may detect a layer including an object (hereinafter, referred to as a second object), which is present at less than a specified depth, on the image based on the image captured by the 3D depth camera.

In operation 605, the processor may extract a specified object (e.g., a human body) (hereinafter referred to as a third object) from the first object. In this operation, the processor may refer to the database (e.g., the database including the information on the shape, the feature, the contour, or the like of the specified object (human body)) constructed in the memory. For example, the processor may identify an object, which is matched at a specified ratio or more in shape, feature, or contour with the specified object of the first object by referring to the database and may extract the third object within an image (or from the first object). In one embodiment, the processor may determine, as a target of the image data setting, a remaining object of the first object except for the extracted third object. In addition, the processor may determine, as the target of the image data setting, a remaining layer of a plurality of layers, which constitutes the image, except for the layer including the second object.

In operation 607, the processor may perform image data setting with respect to at least one object or layer determined as the target of the image data setting. In one embodiment, the processor may control the light transparency of a region, which corresponds to an object or a layer determined as the target of the image data setting, in a screen region of the display 130 (see FIG. 1; e.g., the transparent display), based on the image data setting. For example, the processor may set an alpha (α) value to a specified value (e.g., 100 in the range of 1 to 100) with respect to image data of the object or the layer determined as the target of the image data setting. In addition, the processor may set R, G, and B grayscale values to a specified value (e.g., 255) with respect to the image data of the object or the layer determined as the target of the image data setting.

In operation 609, the electronic device may transmit information on the image data setting and data on an image (e.g., an image by the first camera) captured by the camera module, to the external device 300 of FIG. 1 interacting with the electronic device. According to an embodiment, the display included in the external device may include a transparent display. Accordingly, the second object (e.g., an object having a depth value less than a specified depth on the image captured by the electronic device) or the third object (e.g., an object having specified contour or feature on the image captured by the electronic device) may be displayed on at least a portion of a transparent display screen of the external device displaying the image received from the electronic device. An arbitrary object (e.g., a book) positioned at a rear portion of the transparent display 130*a* may be visualized on a remaining portion of the screen region of the transparent display 130*a*, due to the light transparency resulting from the alpha (α) value (100 in the range of 1 to 100) or the R, G, and B values (e.g., 255), based on the image data setting.

As described above, according to various embodiments, an image processing method of an electronic device may include constructing information associated with a specified object through a database, capturing an image, detecting a plurality of objects included in the image, and performing setting of image data associated with at least one object of the plurality of objects such that a region, which corresponds to the at least one object, in a screen region of a display has a specified light transmittance value.

According to various embodiments, the image processing method may further include transmitting information on an image subject to the setting of the image data to an external device.

According to various embodiments, the transmitting may include outputting a user interface that is able to control whether to transmit the information on the image subject to the setting of the image data.

According to various embodiments, the detecting of the plurality of objects may include extracting a specified object from the plurality of objects based on the database.

According to various embodiments, the setting of the image data may include setting image data associated with at least one object of the plurality of objects except for the specified object.

According to various embodiments, the detecting of the plurality of objects may include extracting at least one object, which has a specified relationship with the specified object, of the plurality of objects.

According to various embodiments, the setting of the image data may include setting image data of at least one object of the plurality of objects except for the specified object and the at least one object having the specified relationship.

According to various embodiments, the detecting of the plurality of objects may include extracting at least one object, which is present at less than a specified depth, of the plurality of objects, based on depth information on the plurality of objects.

According to various embodiments, the setting of the image data may include setting image data associated with at least one object of the plurality of objects except for the at least one object present at less than the specified depth.

According to various embodiments, the setting of the image data may include setting an alpha (α) value, which is included in the image data, to a specified value in association with the setting of the image data.

According to various embodiments, the setting of the image data may include setting R, G, and B grayscale values, which are included in the image data, to a specified value in association with the setting of the image data.

While the disclosure has been shown and described with reference to various embodiments thereof, it will be understood by those skilled in the art that various changes in form and details may be made therein without departing from the spirit and scope of the disclosure as defined by the appended claims and their equivalents. It will be understood by those skilled in the art that various changes in form and details may be made therein without departing from the spirit and scope of the present invention as defined by the appended claims and their equivalents.

The invention claimed is:

1. An electronic device comprising:
   at least one camera module configured to capture an image based on a specified angle of view;
   a display to display another image;
   a memory; and
   a processor electrically connected with the camera module and the display,
   wherein the processor is configured to:
      detect a plurality of objects included in the image;
      obtain depth information on the plurality of objects using the at least one camera module;
      extract a first object, which is present at less than a specified depth, from the plurality of objects based on the depth information; and
      perform setting of image data associated with a second object of the plurality of objects such that a region, which corresponds to the second object, in a screen region of the display has a specified light transmittance value, and
   wherein the second object is different from the first object.

2. The electronic device of claim 1, further comprising:
   a communication interface configured to communicate with an external device,
   wherein the processor is further configured to transmit, to the external device, the image data using the communication interface.

3. The electronic device of claim 1,
   wherein the processor is further configured to:
      extract a third object that is closer to the at least one camera module than the first object, from the plurality of objects based on the depth information; and
      set the image data associated with the second object of the plurality of objects, wherein the second object is different from the third object.

4. The electronic device of claim 1, wherein the processor is further configured to set an alpha ($\alpha$) value, which is included in the image data, to a specified value in association with the setting of the image data.

5. The electronic device of claim 1, wherein the processor is further configured to set R, G, and B grayscale values, which are included in the image data, to specified values in association with the setting of the image data.

6. An image processing method of an electronic device comprising:
   capturing an image;
   detecting a plurality of objects included in the image;
   obtaining depth information on the plurality of objects using at least one camera module of the electronic device;
   extracting an first object, which is present at less than a specified depth, from the plurality of objects based on the depth information; and
   performing setting of image data associated with a second object of the plurality of objects such that a region, which corresponds to the second object, in a screen region of a display has a specified light transmittance value,
   wherein the second object is different from the first object.

7. The image processing method of claim 6, further comprising:
   transmitting the image data to an external device.

8. The image processing method of claim 6, further comprising:
   extracting a third object that is closer to the at least one camera module than the first object, from the plurality of objects based on the depth information.

9. The image processing method of claim 8, wherein the setting of the image data further comprises:
   setting the image data associated with the second object of the plurality of objects, wherein the second object is different from the third object.

10. The electronic device of claim 2, wherein the processor is further configured to:
    determine whether a user of the electronic device is within a specified distance or within a specified angle range; and
    when the user is outside the specified distance or the specified angle range, cease transmission of the image data to the external device.

* * * * *